(12) United States Patent
Kawasaki et al.

(10) Patent No.: US 11,505,284 B2
(45) Date of Patent: *Nov. 22, 2022

(54) RAIN-GUARD DEVICE FOR SHIPPING

(71) Applicant: IHI Transport Machinery Co., Ltd, Tokyo (JP)

(72) Inventors: Yasuhiro Kawasaki, Tokyo (JP); Koji Miyazawa, Tokyo (JP)

(73) Assignee: Transport Machinery Co., Ltd., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 17/058,736

(22) PCT Filed: Jun. 11, 2019

(86) PCT No.: PCT/JP2019/023097
§ 371 (c)(1),
(2) Date: Nov. 25, 2020

(87) PCT Pub. No.: WO2019/240129
PCT Pub. Date: Dec. 19, 2019

(65) Prior Publication Data
US 2021/0214046 A1 Jul. 15, 2021

(30) Foreign Application Priority Data
Jun. 15, 2018 (JP) .............................. JP2018-114436

(51) Int. Cl.
*B63B 19/18* (2006.01)
*B63B 19/24* (2006.01)
*B65G 67/60* (2006.01)

(52) U.S. Cl.
CPC ............. *B63B 19/18* (2013.01); *B63B 19/24* (2013.01); *B65G 67/606* (2013.01); *B65G 2814/0397* (2013.01)

(58) Field of Classification Search
CPC ......... B63B 19/00; B63B 19/12; B63B 19/18; B63B 2019/185; B63B 19/24; B63B 19/26; B63B 19/28
(Continued)

(56) References Cited

U.S. PATENT DOCUMENTS 2,331,197 A * 10/1943 Johnston .................. B60P 3/205
62/328
2,663,268 A * 12/1953 Ahnell ..................... B61C 17/04
105/377.07
(Continued)

FOREIGN PATENT DOCUMENTS

DE 3009139 A1 9/1981
EP 0916572 A2 5/1999
(Continued)

OTHER PUBLICATIONS

International Search Report for PCT Serial No. PCT/JP2019/023097 dated Sep. 3, 2019.

*Primary Examiner* — Daniel V Venne
(74) *Attorney, Agent, or Firm* — McCormick, Paulding & Huber PLLC

(57) ABSTRACT

The present disclosure provides an inexpensive rain-guard device for shipping, that can cope with large vessels. The rain-guard device for shipping has a rail 19, which is disposed on a sliding hatch cover 11, an on-board chute 22, which is provided on the rail 19 in a travelable manner, covers part of a hatch opening 13, and, furthermore, supplies cargo from a shiploader 1 into a hold 7, and a lid member 23, which covers another part of the hatch opening 13, and the lid member 23 is disposed both in front and in rear in the traveling direction of the on-board chute 22, and, furthermore, configured to expand and contract as the on-board chute 22 travels.

15 Claims, 12 Drawing Sheets

(58) Field of Classification Search
USPC .................................... 114/201 R, 202, 203
See application file for complete search history.

(56) References Cited

U.S. PATENT DOCUMENTS

| | | |
|---|---|---|
| 8,818,586 B2 | 8/2014 | Pereira |
| 2014/0331911 A1 | 11/2014 | Rudiger Lilenthal |

FOREIGN PATENT DOCUMENTS

| | | |
|---|---|---|
| FR | 2457214 A1 | 12/1980 |
| JP | S59100080 A | 6/1984 |
| JP | 3179239 B2 | 6/2001 |
| WO | 9402350 A1 | 2/1994 |
| WO | 2005123494 A1 | 12/2005 |
| WO | 2014167417 A2 | 10/2014 |
| WO | 2018185712 A1 | 10/2018 |
| WO | 2019092936 A1 | 5/2019 |

* cited by examiner

RAIN-GUARD DEVICE FOR SHIPPING

CROSS-REFERENCE TO RELATED APPLICATIONS

This application is a National Stage application of International Patent Application No. PCT/JP2019/023097, filed on Jun. 11, 2019, which claims priority to Japanese Patent Application No. 2018-114436 filed on Jun. 15, 2018, each of which is hereby incorporated by reference in its entirety.

BACKGROUND

Technical Field

The present disclosure relates to a rain-guard device for shipping, which, when loading cargo such as grains or the like on ships with a shiploader, prevents the cargo from getting wet from rainfall, prevents the wind, and prevents the cargo being loaded from scattering.

Background Art

As devices for preventing cargo being loaded from getting wet from rainfall, those described in Japanese Patent Publication No. 3179239 and U.S. Pat. No. 8,818,586 are known.

With the device described in Japanese Patent Publication No. 3179239, a building is constructed on the quay, and an overhanging roof is provided in this building.

Also, the device described in U.S. Pat. No. 8,818,586 covers a hatch with a film that hangs from a shiploader.

SUMMARY

However, the device described in Japanese Patent Publication No. 3179239 has problems in that it is difficult to cope with large vessels, and, furthermore, the cost of installation is high.

Also, the device described in U.S. Pat. No. 8,818,586 is comprised of many pieces of equipment, and has problems that it is difficult to control and expensive, and, furthermore, the shiploader also has to be modified in many ways, which entails high costs of modifications.

So, the present disclosure has been created in view of these circumstances, its object is to provide an inexpensive rain-guard device for shipping that can cope with large vessels.

According to one aspect of the present disclosure, a rain-guard device for shipping is provided, which has a rail, which is disposed on a sliding hatch cover that opens and closes an upper opening of a hold of a vessel, an on-board chute, which is provided on the rail in a travelable manner, covers part of a hatch opening that is formed when the sliding hatch cover opens, and, furthermore, supplies cargo from a shiploader into the hold, and a lid member, which covers another part of the hatch opening, and in which the lid member is disposed both in front and in rear in a traveling direction of the on-board chute, and, furthermore, configured to expand and contract as the on-board chute travels.

Preferably, the lid members may be provided on the rail in a travelable manner.

Preferably, the lid members may be formed in a bellows shape.

Preferably, the lid members may have one end, which is fixed to the on-board chute, and another end, which is fixed to the rail near an end part of the hatch opening.

Preferably, the rail may be made up by joining a plurality of rail pieces in a longitudinal direction and the other end of the lid member may be detachably fixed to the rail near the end part of the hatch opening.

Preferably, a fastener for holding the lid member in a contracted state is provided in the on-board chute.

Preferably, the fastener may have a rail fixing part that is fixed to the rail.

Preferably, the rail may be disposed in both left and right sliding hatch covers, and the left and right rails may be joined via a beam frame.

Preferably, a net for preventing fall into the hold may be provided between the left and right rails.

Preferably, the rail may be provided with a guard member for preventing water from seeping into the hatch opening along the longitudinal direction of the rail, to stick out upward above the rail.

Preferably, an elastic water-stop material may be interposed between the rail and the sliding hatch cover to abut the sliding hatch cover.

Preferably, an end-part sheet for preventing rainwater from seeping into the hatch opening may be arranged at the other end of the lid member.

Preferably, the rail may be made up by joining a plurality of types of rail pieces having varying lengths, in the longitudinal direction.

Preferably, a window for checking condition of cargo visually may be provided in one or both of the on-board chute and the lid member.

Preferably, the on-board chute may have a traveling part which travels on the rail, and a chute body part which is provided to penetrate the traveling part in a vertical direction, the chute body part may extend downward below the traveling part, and a leg that extends downward below the chute body part may be provided in the traveling part and the lid member.

Preferably, when the rail is disposed on the sliding hatch cover, the traveling part is disposed on the rail in a travelable manner and the chute body part is inserted in the hatch opening, the leg may be arranged on the chute body part so as to be inserted in the hatch opening.

According to the present disclosure, it is possible to provide an inexpensive rain-guard device for shipping that can cope with large vessels.

DETAILED DESCRIPTION

Figure 1:
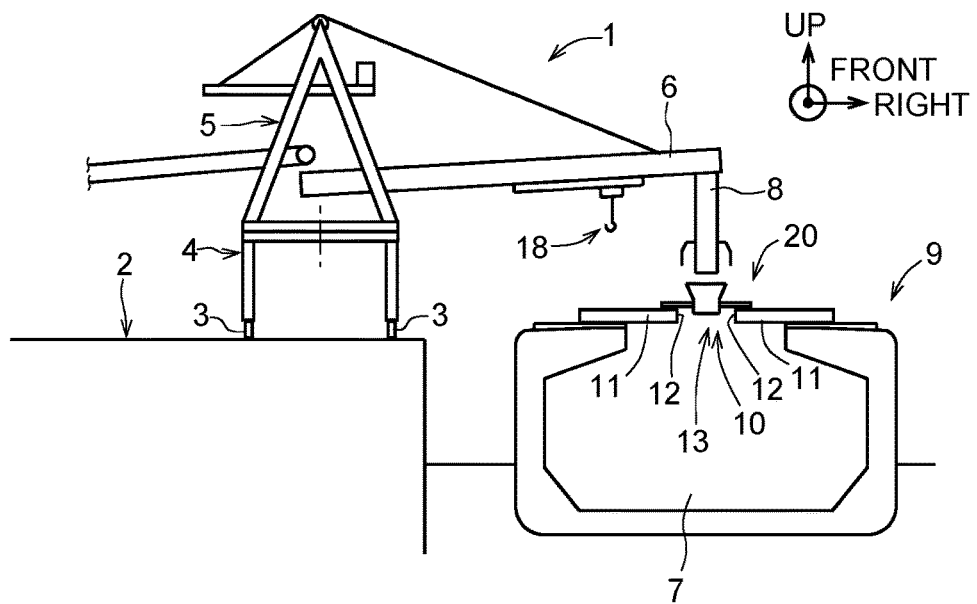
FIG. 1 is a schematic front view of a rain-guard device for shipping according to an embodiment of the present disclosure.
Figure 2:
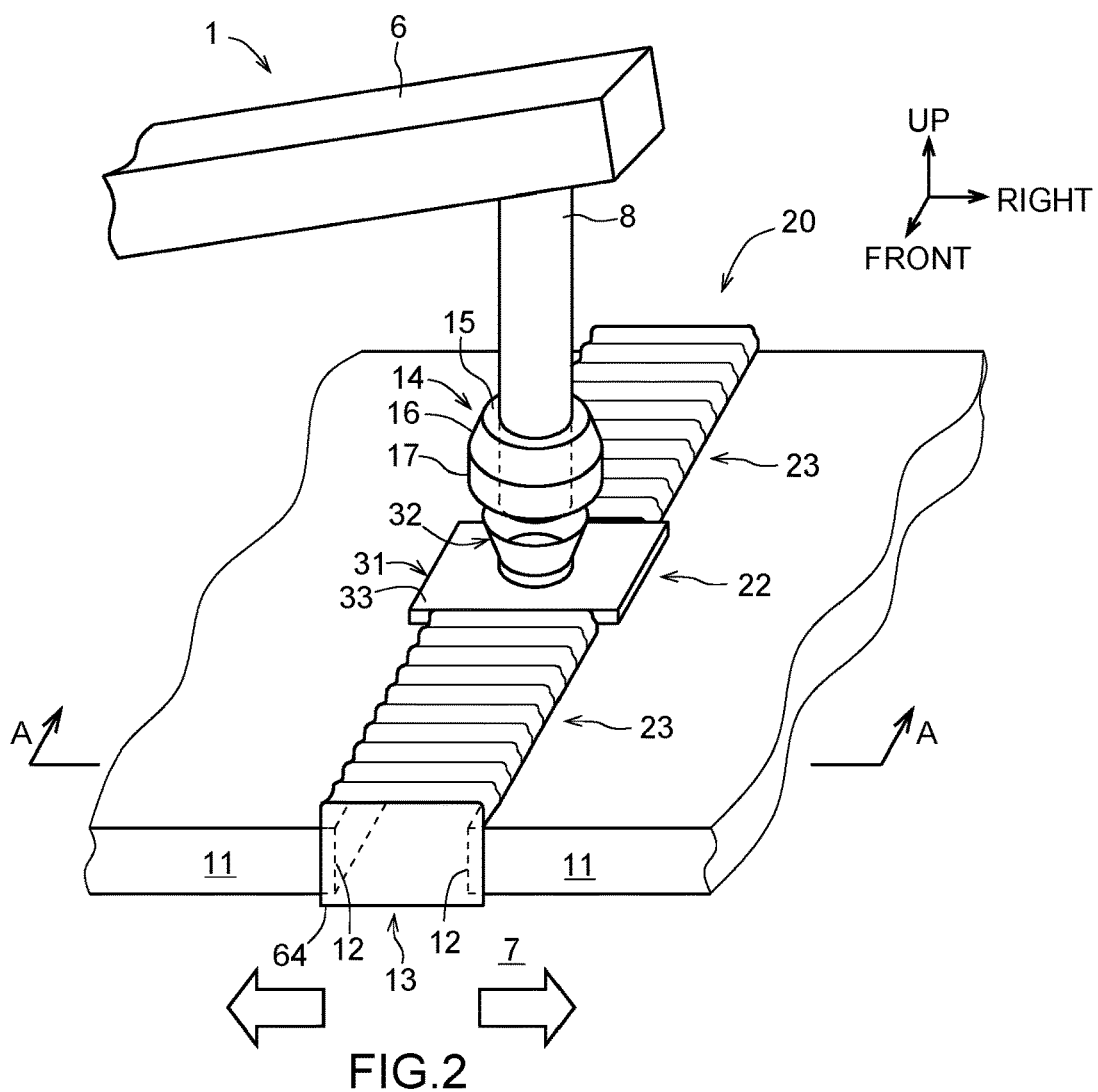
FIG. 2 is a perspective view of a main part of FIG. 1.
Figure 3:
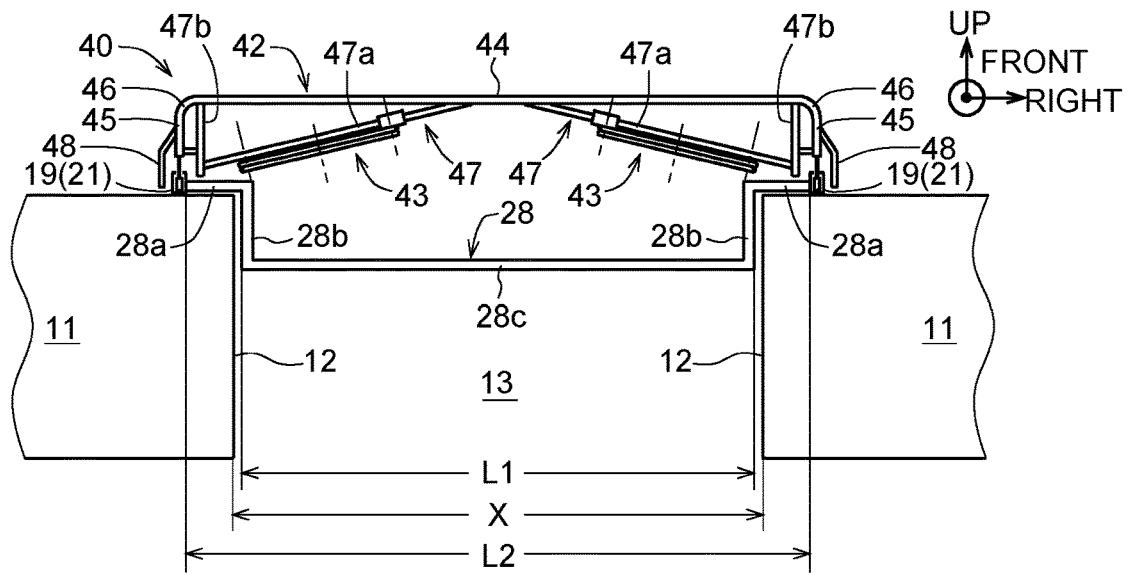
FIG. 3 is a cross-sectional view taken along the A-A line of FIG. 2.

Now, embodiments of the present disclosure will be described below with reference to the accompanying drawings. FIG. 1 is a schematic front view of a shiploader, a vessel, and a rain-guard device for shipping according to the present embodiment. FIG. 2 is a schematic perspective view of a rain-guard device for shipping as set on a vessel, seen from a high oblique angle. FIG. 3 is a front view of the lid member. Note that, for ease of description, with the present embodiment, the directions along which the sliding hatch covers open and close are left and right directions, and directions that are horizontally perpendicular and at right angles to these left and right directions are front and rear directions.

First, the shiploader and the vessel will be described.

As shown in FIG. 1, the shiploader 1 has a traveling part 4, which travels on a rail 3 laid on the quay 2, a rotating part 5, which is provided on the traveling part 4 in a rotatable manner, a boom 6, which is provided on the rotating part 5 so as to be raised and lowered freely, and a chute part 8, which hangs from the tip of the boom 6 and supplies cargo such as grains or the like into a hold 7. The boom 6 is provided with a conveyor (not shown) for transferring the cargo from the quay 2 to the chute part 8. Note that the cargo is not limited to grains. The cargo may be other bulk materials that are preferred not to get wet in the rain.

Also, the shiploader 1 is provided with an unloading device 18, which lifts the rail units 30 (see FIG. 10), the chute unit 58 (see FIG. 12) and so on, which will be described later, so as to be moved up and down freely. The unloading device 18 is comprised of a hoist, and is provided in the boom 6 of the shiploader 1.

The vessel 9 is a cargo ship. The vessel 9 has a hold 7 with an upper opening 10, and sliding hatch covers 11, which open and close the upper opening 10. A pair of sliding hatch covers 11 are provided opposite each other on both left and right sides of the vessel 9, and, furthermore, provided so as to be slidable in left and right directions (directions along the vessel's width). That is, the sliding hatch covers 11 are designed to open left and right, closes the upper opening 10 by pressing the opposing ends 12 against each other, and opens the upper opening 10 by separating the opposing ends 12 from each other. The sliding hatch covers 11 are formed so as to open the upper opening 10 at an arbitrary distance. Hereinafter, the opening that is formed by opening the sliding hatch covers 11 will be referred to as a "hatch opening 13." Note that the sliding hatch covers 11 may be provided so as to be slidable in front and rear directions with respect to the vessel 9.

Next, the rain-guard device for shipping according to the present embodiment will be described.

As shown in FIG. 1, FIG. 2 and FIG. 3, the rain-guard device for shipping 20 has rails 19, which are disposed on sliding hatch covers 11, an on-board chute 22, which is provided on the rail 19 in a travelable manner and which covers part of the hatch opening 13, and lid members 23, which cover the rest of the parts of the hatch opening 13.

The rails 19 are disposed on the left and right sliding hatch covers 11 in parallel, and to extend in front and rear directions. Also, the rails 19 are made up by joining a plurality of rail pieces 21, which are shorter than the front-to-rear dimension of the hatch opening 13, along longitudinal directions (front and rear directions). The length of the rails 19 are set to be substantially the same as the front-to-rear length of the hatch opening 13 when a predetermined number of (for example, five) rail pieces 21 are joined. Note that the rails 19 do not have to be a joint structure. In this case, a rail 19 is comprised of one rail piece 21, and the length of a rail piece 21 may be set to be substantially the same as the length of the hatch opening 13.

Figure 4:
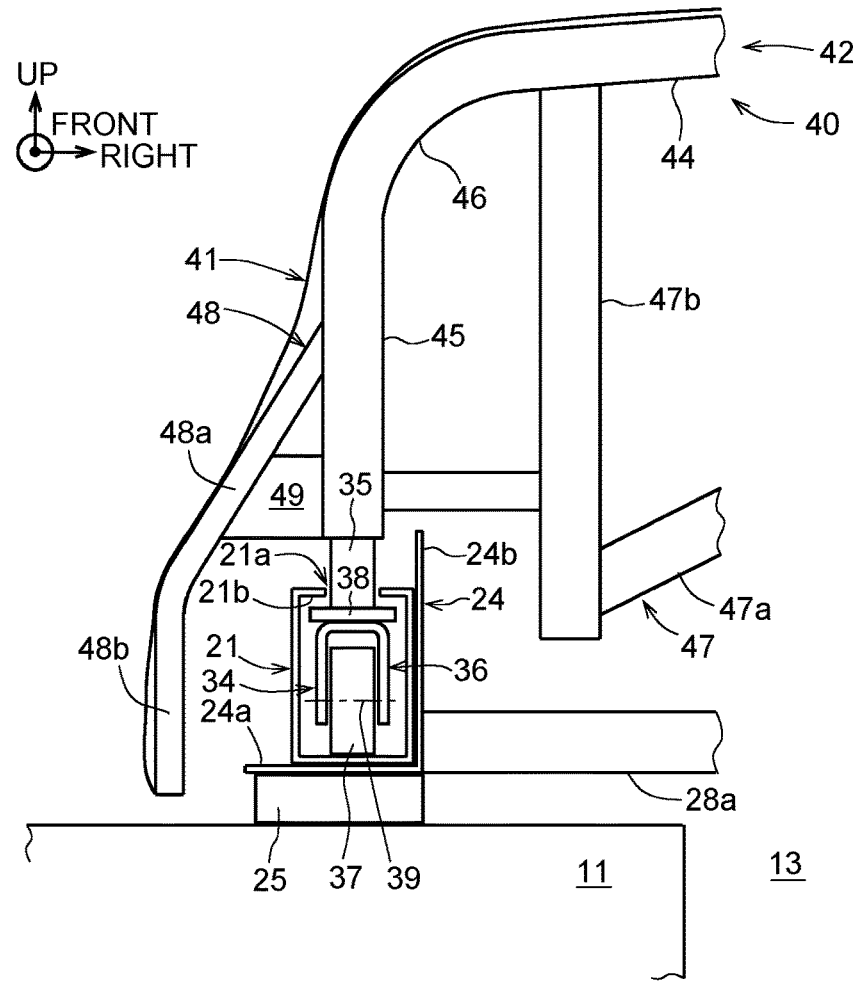
FIG. 4 is an enlarged view of a main part of FIG. 3.

As shown in FIG. 4, each rail piece 21 is formed in a rectangular frame shape in cross section, and, furthermore, has a slit 21a, which extends in the longitudinal direction, in the upper surface. The slit 21a is formed at the center in the widthwise direction of the rail piece 21.

Also, in each rail piece 21, a guard member 24 for preventing water from seeping into the hatch opening 13 is provided along the longitudinal direction of the rail piece 21, over its entire length. The guard member 24 is comprised of an L-shaped angle steel, and has a horizontal part 24a, which extends in the horizontal direction, and a rising part 24b, which is raised at right angles at the end of the horizontal part 24a near the hatch opening 13 side. The horizontal part 24a is fixed so as to overlap the bottom surface of the rail piece 21. In the bottom surface of the horizontal part 24a, a water-stop material 25 is placed on the sliding hatch cover 11 along the longitudinal direction, and fixed in an overlapping manner. The water-stop material 25 is made of elastic rubber, and functions also as a buffer material. When the water-stop material 25 is placed on the sliding hatch cover 11, the water-stop material 25 is deformed in accordance with the bumps on the sliding hatch cover 11 and absorbs these bumps. The water-stop material 25 is formed in a rectangular shape in cross section. The dimension of the water-stop material 25 in left and right directions (widthwise direction) is set to be the same as that of the horizontal part 24a. The lengths of the rail piece 21, the guard member 24 and the water-stop material 25 in front and rear directions are set to be the same. Note that the guard member 24 may be comprised of the rising part 24b alone. In this case, the guard member 24 may be fixed to the side surface of the rail piece 21. Then, the water-stop material 25 may be fixed to the bottom surface of the rail piece 21. Furthermore, the water-stop material 25 needs not be fixed to the guard member 24 or the rail piece 21. That is, between the rail piece 21 and the sliding hatch cover 11, the water-stop material 25 may be interposed to abut the sliding hatch cover 11.

Figure 10:
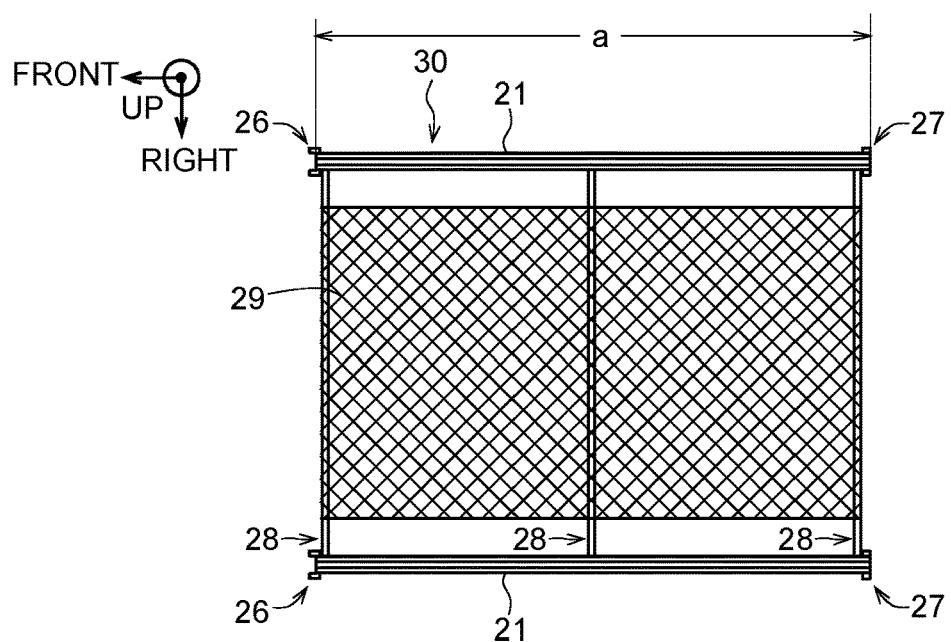
FIG. 10 is a top view of a rail unit.
Figure 11:
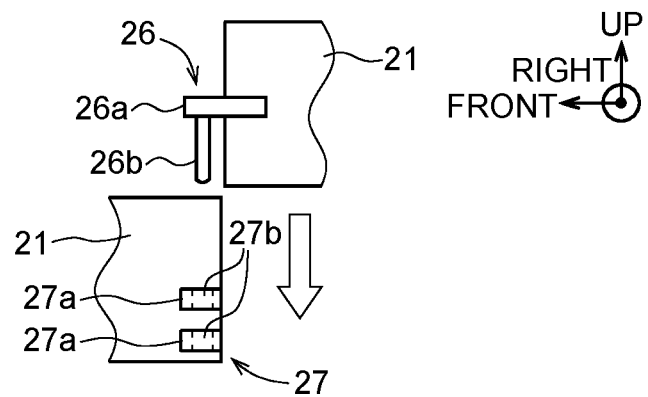
FIG. 11 is an enlarged view of a joining part of a chute unit and a rail unit.

Also, as shown in FIG. 10 and FIG. 11, in one end part of a rail piece 21, male joining piece 26 for joining rail pieces 21 with each other are provided, and, in the other end part, female joining pieces 27 to be joined with male joining pieces 26 in a disengageable manner are provided. A male joining piece 26 has extending parts 26a, which are provided on both the left and right sides of one end part of a rail piece 21, and extend from one end of the rail piece 21, and joining pins 26b, which are provided in the tip parts of the extending parts 26a and extend downward. A female joining piece 27 has receiving parts 27a, which are provided on both the left and right sides of the other end part of the rail piece 21, and insertion holes 27b, which are provided in the receiving parts 27a to extend upward and downward, and in which the joining pins 26b are to be inserted. The receiving parts 27a are formed in the shape of a flat plate, and, furthermore, formed in two upper and lower steps.

As shown in FIG. 3 and FIG. 10, left and right rail pieces 21 are joined via guard members 24 and a beam frame 28. The beam frame 28 has upper step parts 28a, which extend from the rising parts 24b of the guard members 24 toward the center between the rail pieces 21, lower extending parts 28b, which extend downward from the tips of these upper step parts 28a, and a lower step part 28c, which is formed between these lower extending parts 28b and extends in the horizontal direction. The proximal end of an upper step part 28a is connected to the rising part 24b of the guard member 24. When the rail pieces 21 are disposed on sliding hatch covers 11, the lower extending parts 28b and the lower step part 28c are positioned between the sliding hatch covers 11. In particular, the distance between the left and right extending parts 28b is set so that the left and right extending parts 28b are brought close to the opposing ends 12 of the sliding hatch covers 11 when the hatch opening 13 opens up at a given distance X, which is determined in advance. In this way, the lower extending parts 28b and the lower step part 28c are positioned between the sliding hatch covers 11, and the left and right extending part 28b are brought close to the opposing ends 12 of the sliding hatch covers 11, so that the positions of rail pieces 21 in left and right directions can be controlled. Consequently, for example, even when rail pieces 21 receive force in left and right directions due to the wind or the like, the rail pieces 21 can be prevented or restrained from shifting in left and right directions.

Also, a plurality of beam frames 28 are provided in left and right guard members 24, at intervals in front and rear directions. A net 29 for preventing fall into the hold 7 is provided to stretch between beam frames 28 that are separate front and rear. Note that the net 29 may be provided to stretch between left and right guard members 24, or may be provided to stretch between left and right rail pieces 21. That is, the net 29 may be provided to stretch between any members as long as it is provided between rail pieces 21.

In this way, a ladder-shaped rail unit 30 is made up by joining left and right rail pieces 21 via a beam frame 28. Consequently, the rail piece 21 can be transferred efficiently between the quay 2 and the vessel, and the rail piece 21 can be disposed efficiently on sliding hatch covers 11.

Figure 8:
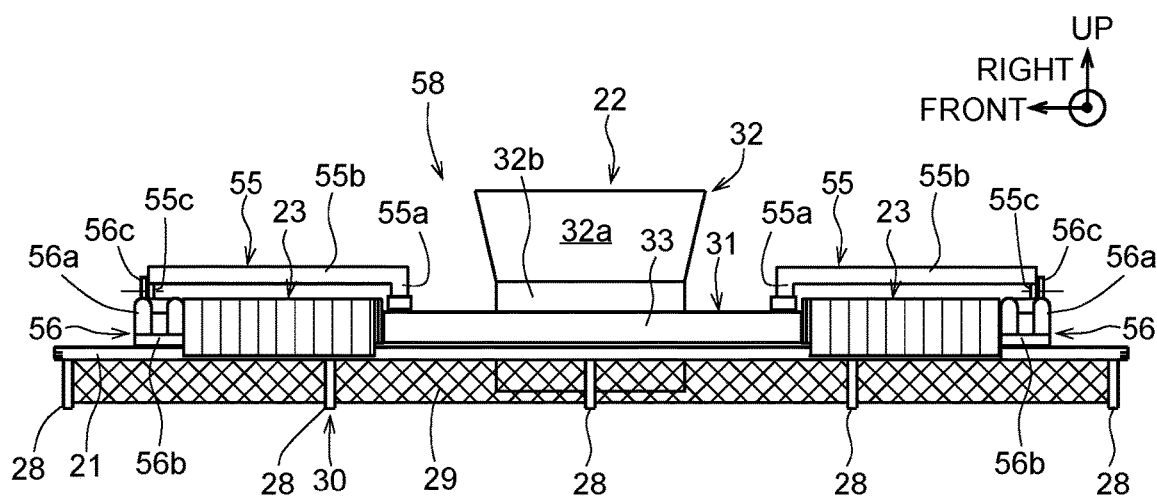
FIG. 8 is a side view of a chute unit.

As shown in FIG. 2 and FIG. 8, an on-board chute 22 has a traveling part 31, which is provided on a rail piece 21 in a travelable manner, and a chute body part 32 for supplying the cargo from the shiploader 1 into the hold 7.

The traveling part 31 has a traveling base part 33 formed in a plate shape, and a plurality of fixed casters 34 (see FIG. 4) provided in the traveling base part 33. The traveling base part 33 is formed in a rectangular shape when seen from the top. The fixed casters 34 are the same as those of the lid member 23, which will be described later. A fixed caster 34 has a leg part 35, which is fixed to the traveling base part 33 and extends downward, a shaft support part 36, which is provided at the lower end of the leg part 35, a wheel 37, which is provided in the shaft support part 36 in a rotatable manner, and a retainer 38, which is provided in the leg part 35. The leg part 35 is formed rod-shaped, with a round cross section. Also, the leg part 35 penetrates the slit 21a of the rail piece 21. The shaft support part 36 is disposed in the rail piece 21 and is formed in a bifurcated shape. An axle 39 is provided in the shaft support part 36. The wheel 37 is provided around the axle 39 in a rotatable manner. The retainer 38 is formed in a plate shape wider than the slit 21a, and is configured to interfere with the ceiling surface 21b of the rail piece 21 when moved upward. By this means, the fixed caster 34 is prevented from passing through the slit 21a and derailing from the rail piece 21.

Figure 7:
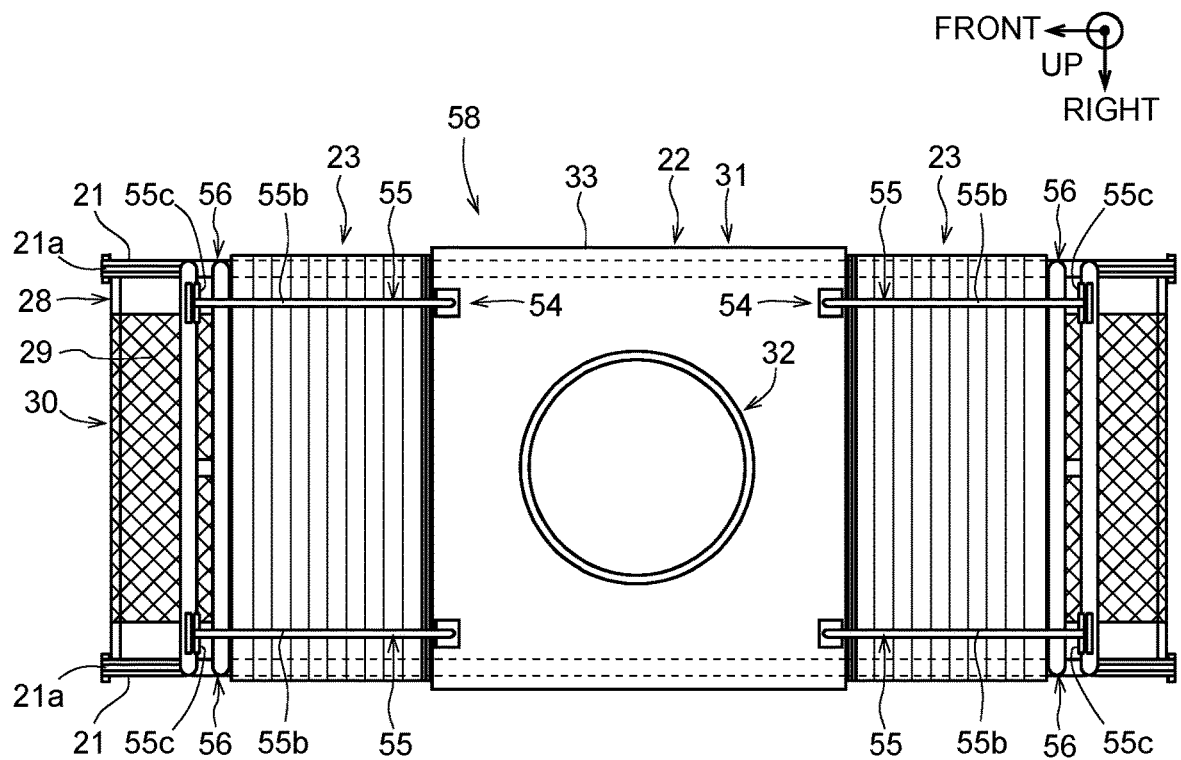
FIG. 7 is a top view of a chute unit.

As shown in FIG. 7 and FIG. 8, a chute body part 32 is disposed at the center of the traveling base part 33 in front-rear and left-right directions. The chute body part 32 is formed in a cylindrical shape extending in the vertical direction. The chute body part 32 has a tapered pipe part 32a, which is formed in the upper part of the chute body part 32 and increases in diameter as it goes upward, and a straight pipe part 32b, which is connected to the lower end of the tapered pipe part 32a and extends vertically. The upper end of the tapered pipe part 32a is formed to have a larger diameter than the chute part 8 of the shiploader 1 and, furthermore, to have a smaller diameter than the side plate part 17 of the cover member 14, which will be described later. The straight pipe part 32b penetrates the traveling base part 33 from top to bottom, and, furthermore, is fixed to the traveling base part 33. Also, the straight pipe part 32b below the traveling base part 33 has a length that does not interfere with the beam frame 28.

Also, as shown in FIG. 2, a cover member 14 to cover the tapered pipe part 32a from above is provided in the chute part 8 of the shiploader 1. Also, the cover member 14 is used to apply force to the tapered pipe part 32a in front and rear directions. The cover member 14 is made of metal. The cover member 14 has a top plate part 15, which extends outward from the outer periphery of the chute part 8 in the radius direction, an inclined plate part 16, which increases in diameter as it extends downward from the outer peripheral end of the top plate part 15, and a side plate part 17 of a cylindrical shape, which extends downward from the lower end of the inclined plate part 16. The top plate part 15 is formed in an annular shape, the inner peripheral end of the top plate part 15 is connected to the outer periphery of the chute part 8 over the entire circumference, in a liquid-tight manner, by means of welding or the like. By this means, the top plate part 15 can block the rain water that flows down along the chute part 8, and the load that is discharged from the chute part 8 can be prevented or restrained from getting wet. The side plate part 17 is formed to have a larger diameter than the tapered pipe part 32a, and covers the outer periphery of the tapered pipe part 32a. By this means, the side plate part 17 can prevent or restrain the rainfall from catching the wind and finding its way into the tapered pipe part 32a from the side. Then, the side plate part 17 pushes the tapered pipe part 32a with the inner peripheral plane, when the chute part 8 is moved front and rear directions. Also, when human body or the like hit from the side, the inclined plate part 16 and the side plate part 17 catch the human body or the like with their faces to protect the human body or the like.

Note that the cover member 14 may be made of a relatively hard material other than metal. The cover member 14 may be made of material for structures such as glass fiber, reinforced plastic and so on.

The lid members 23 are formed in a bellows shape and disposed in the front and rear of the on-board chute 22. Also, the lid members 23 are configured to expand and contract as the on-board chute 22 travels. In other words, when the on-board chute 22 travels forward, the lid member 23 in front of the on-board chute 22 is contracted forward, and the lid member 23 behind the on-board chute 22 is expanded forward. When the on-board chute 22 travels backward, the lid member 23 behind the on-board chute 22 is contracted backward, and the lid member 23 in front of the on-board chute 22 is expanded backward. Also, one end of the lid member 23 in front and rear directions is fixed to the on-board chute 22. The other end of the lid member 23 in front and rear directions is fixed to the rail 19 (see FIG. 3), near the end part of the hatch opening 13, in a detachable manner. Note that, when the rail 19 is not a joint structure, the other end of the lid member 23 may be fixed to the rail 19 in an unremovable manner.

As shown in FIG. 3 and FIG. 4, the lid member 23 has a frame structure 40, which is formed to be expandable and contractable in front and rear directions, and a water-stop sheet 41, which is provided on the frame structure 40.

The frame structure 40 has a plurality of arch frames 42, which are formed in an arch-shape across the left and right rail pieces 21, and a telescopic link 43, which joins the arch frames 42 so that these arch frames 42 can be close to or distant from each other in front and rear directions.

An arch frame 42 is formed round in cross section. By this means, the water-stop sheet 41 in contact with the arch frame 42 is prevented or restrained from being damaged.

Furthermore, the arch frame 42 has a center frame part 44, which is formed in the center in left and right directions and extends along left and right directions, rising frame parts 45, which are formed in both the left and right end parts and extend in the vertical direction, arc-shaped frame parts 46, which are formed in an arc shape and connect between the center frame part 44 and the rising frame parts 45, and link receiving frame parts 47, which are coupled with telescopic links 43.

The back surface of the water-stop sheet 41 is fixed to the center frame part 44. A fixed caster 34, which has been described earlier, is provided at the lower end of the rising frame part 45. Furthermore, a guide frame 48 is provided in the rising frame part 45, which guides the water-stop sheet 41 that hangs down from the arc-shaped frame part 46 outwardly (in the direction to part from the hatch opening 13). The guide frame 48 is formed to have a round cross section. The guide frame 48 has an inclined guide part 48a, which extends outward and obliquely downward from the upper part of the rising frame part 45, and a vertical guide part 48b, which extends vertically downward from the lower end of the inclined guide part 48a. A reinforcing frame 49 is provided between the inclined guide part 48a and the rising frame part 45. The lower end of the vertical guide part 48b is set at a position lower than the lower end position of the rail piece 21 and is set to a height that does not touch the sliding hatch cover 11. The water-stop sheet 41 is fastened to the lower end of the vertical guide part 48b.

The back surface of the water-stop sheet 41 abuts the outer periphery part of the arc-shaped frame part 46. The outer periphery part of the arc-shaped frame part 46 is formed in an arc shape, thereby preventing or restraining the abutting water-stop sheet 41 from being damaged.

The link receiving frame parts 47 are provided symmetrically with respect to the center of the center frame part 44 in left and right directions. To be more specific, a link receiving frame part 47 has a slide guide part 47a, which is inclined and extends obliquely downward from the center part in left and right directions, toward the outside in left and right directions, a support frame part 47b, which is provided in either the left or the right end part of the center frame part 44, and which extends downward and connects with the tip of the slide guide part 47a.

Figure 5:
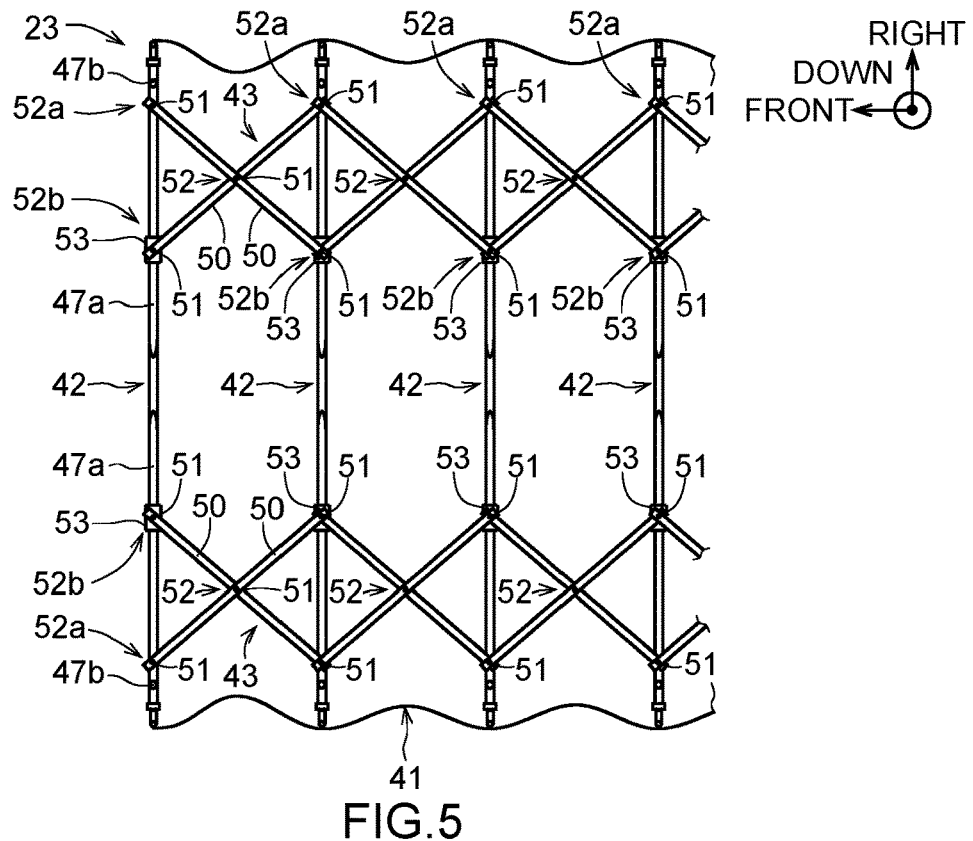
FIG. 5 is a bottom view of a lid member.
Figure 6:
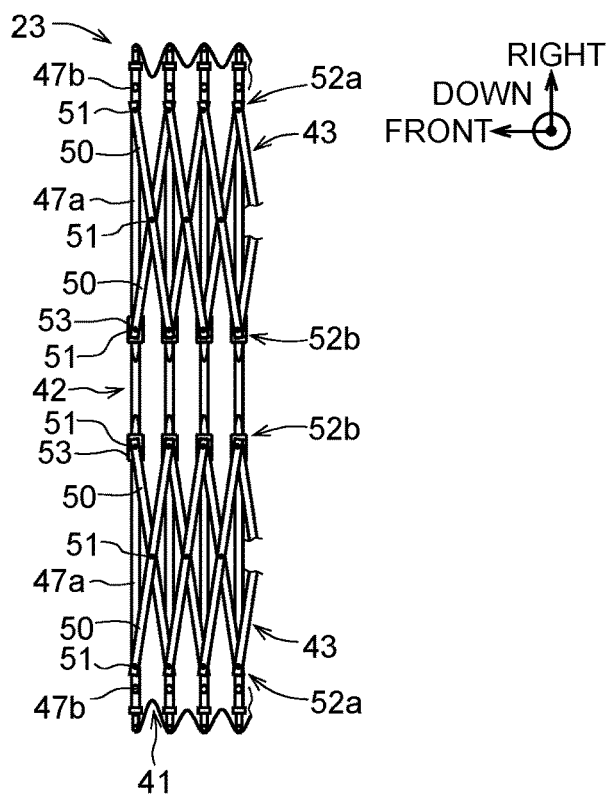
FIG. 6 is a bottom view of the lid member as contracted.

As shown in FIG. 5 and FIG. 6, a telescopic link 43 is made up by joining a plurality of crossing members 52, which are each formed by coupling a pair of stick-shaped frames 50 in the shape of the letter X, via a pin 51. The crossing members 52 are joined by coupling the tips of stick-shaped frames 50 with each other via pins 51. The end parts of a crossing member 52 are classified into a fixed end part 52a, which is provided in the slide guide part 47a so as not to be able to move in left and right directions, and a movable end part 52b, which is provided in the slide guide part 47a so as to be slidable in left and right directions. The fixed end part 52a is positioned on the support frame part 47b side, and is coupled with the slide guide part 47a, via the pin 51, in a rotatable manner. Also, the movable end part 52b is positioned on the opposite side of the support frame part 47b, and coupled with the slider 53 via the pin 51, in a rotatable manner. The slider 53 is a cylindrical member, and provided in the slide guide part 47a in an axially slidable manner.

Note that, alternatively, the movable end part 52b may be positioned on the support frame part 47b side, and the fixed end part 52a may be positioned on the opposite side of the support frame part 47b.

The water-stop sheet 41 is a flexible sheet, made of resin. As shown in FIG. 4, the water-stop sheet 41 is provided on the outside of each arch frame 42, and, furthermore, deformed to expand and contract between arch frames 42.

Figure 9:
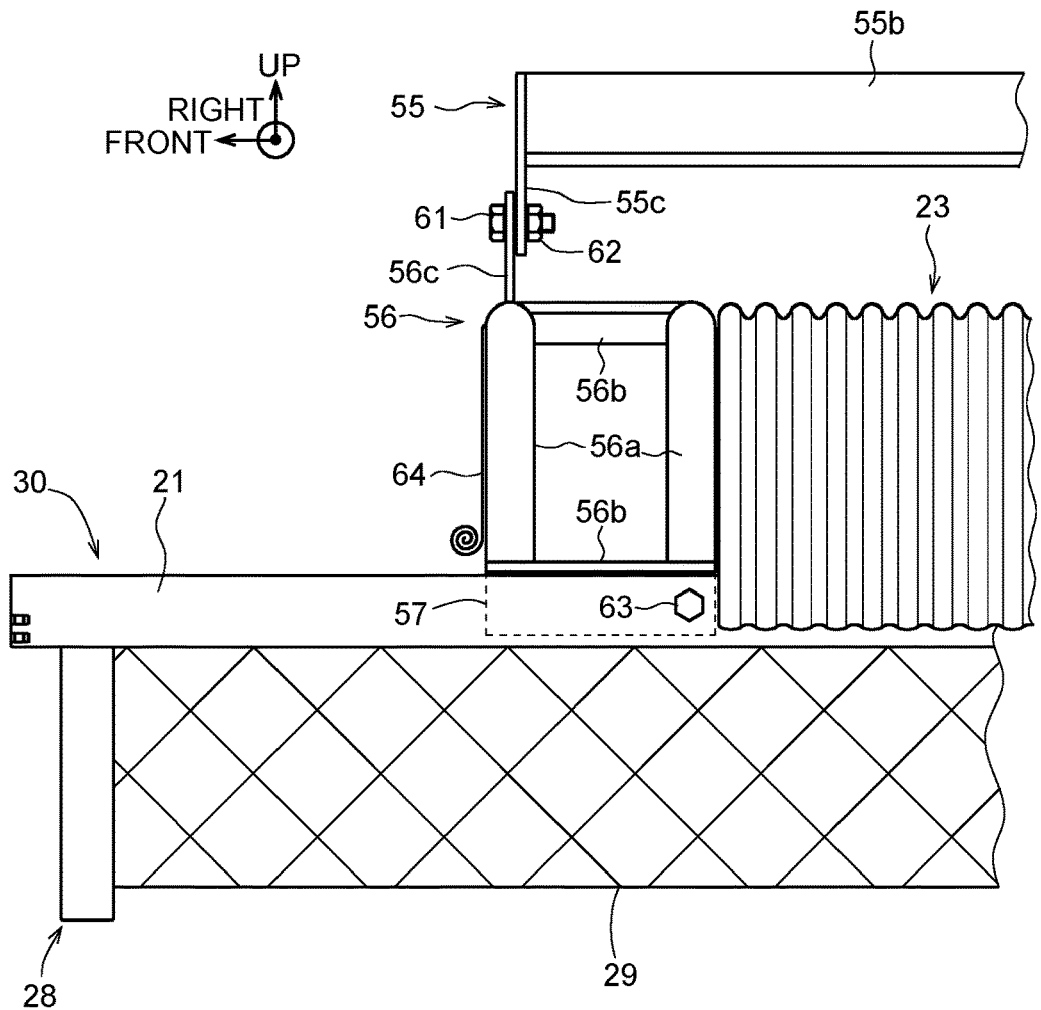
FIG. 9 is an enlarged view of a main part of FIG. 9.

Also, as shown in FIG. 7, FIG. 8 and FIG. 9, in the front end part and the rear end part of the on-board chute 22, fasteners 54 for holding the lid members 23 in a contracted state are provided. The fasteners 54 are provided in the on-board chute 22 so as to be symmetrical in front and rear directions. Consequently, the front fastener 54 alone will be described below, and the rear fastener 54 will be assigned the same reference numerals in the drawing, and the description thereof will be omitted. Also, the "front extending part 55b" to constitute the front fastener 54 will be read as a "rear extending part 55b" in the rear fastener 54.

The front fastener 54 has a support rod 55, which is provided in the front end part of the traveling base part 33 and extends forward, and an engaging part 56, which is formed in the end part of the lid member 23 and attached to the front end part of the support rod 55 in a detachable manner.

A pair of support rods 55 are provided in the top surface of the traveling base part 33, so as to be apart from each other left and right. A support rod 55 has an upper extending part 55a, which is provided in the top surface of the traveling base part 33 and extends upward, a front extending part 55b, which is bent from the upper end of the upper extending part 55a and extends forward, and a lower extending part 55c, which is provided at the front end of the front extending part 55b and extends downward. The upper extending part 55a extends up to a position higher than the lid member 23. The front extending part 55b is positioned above the lid member 23, and extends forward beyond the contracted lid member 23. The lower extending part 55c is formed in a plate shape, and positioned above the lid member 23. By this means, even when the lid member 23 is expanded, the lid member 23 does not abut the front extending part 55b or the lower extending part 55c. In the lower extending part 55c, a screw hole (not shown) for inserting a bolt 61 for attaching an engaging part 56 is formed. The screw hole is formed to extend in front and rear directions.

The engaging part 56 is formed in an arch shape across the left and right rail pieces 21. By this means, when the engaging part 56 is attached to the lower extending part 55c of the support rod 55, the engaging part 56 interferes with the arch frame 42 (see FIG. 3) of the lid member 23 and restricts the movement in the direction in which the lid member 23 expands. As shown in FIG. 9, the engaging part 56 has a pair of front and rear arch parts 56a, which are each formed by bending a pipe in an arch shape, joining parts 56b for joining these arch parts 56a, and a fastening bracket part 56c, which is provided in an arch part 56a to extend upward, and fastened to a lower extending part 55c of the support rod 55. A water-stop sheet (not shown) is provided to stretch between the front and rear arch parts 56a. By this means, among the gaps formed between the front and rear arch parts 56a, the gaps in the upper part and both side parts are sealed in a liquid-tight manner. The joining parts 56b are each comprised of an L-shaped angle steel, and are disposed in the center part and both end parts in the longitudinal direction of the arch parts 56a. Furthermore, in particular, the joining parts 56b disposed at both end parts of the arch part 56a constitute a rail fixing part 57 that is fixed to the rail piece 21.

The rail fixing part 57 is comprised of a joining part 56b that is inserted into a slit 21a when placed on a rail piece 21. To be more specific, in the lower end surface of the arch part 56a, a joining part 56b having an L-shaped cross section is attached in an overlapping manner. By this means, the joining part 56b is sticks out downward, and can be inserted into the slit 21a. Furthermore, a screw hole (not shown) for screwing a bolt 63 is formed in the rail fixing part 57. Then, a bolt hole (not shown) for inserting the bolt 63 is formed in the rail piece 21. By inserting the bolt 63 in this bolt hole and screwing the bolt 63 in the screw hole of the rail fixing part 57, the rail fixing part 57 is locked to the rail piece 21 in front and rear directions.

The fastening bracket part 56c is formed in a plate shape, and provided in the arch part 56a that is opposite to the arch part 56a abutting the lid member 23. A screw hole (not shown) for inserting the bolt 61 is formed in the fastening bracket part 56c. The screw hole is formed to extend in front and rear directions. The fastening bracket part 56c is fastened to the lower extending part 55c with the bolt 61 and a nut 62. Note that the fastening bracket part 56c may be provided in the arch part 56a abutting the lid member 23, or may be provided in the joining part 56b.

Also, an end-part sheet 64 for preventing rainwater from seeping into the hatch opening 13 is arranged at the other end of the lid member 23. The end-part sheet 64 is made of flexible resin like the water-stop sheet 41. The end-part sheet 64 is provided in the arch part 56a positioned at the other end of the lid member 23 to hang down from its upper edge. Also, the lower end of the end-part sheet 64 reaches a point below the lower end of the sliding hatch cover 11. By this means, the hatch opening 13 formed between the side surfaces of the sliding hatch covers 11 can also be sealed, so that it is possible to prevent or restrain, more effectively, rainwater from seeping into the hatch opening 13.

In this way, fasteners 54 are provided in the on-board chute 22, so that, when transferring the on-board chute 22 between the quay 2 and the vessel, by retracting the lid members 23 and fastening these retracted lid members 23 with the fasteners 54 as shown in FIG. 8, all can be made a unit together with the rail units 30 (hereinafter referred to as the "chute unit 58"). Then, the on-board chute 22, the lid members 23, and part of the rail units 30 can be transferred quickly and easily.

Note that the fasteners 54 do not have to be provided, in the on-board chute 22, to be symmetrical in front and rear directions. For example, the positions of support rods 55 in left and right directions may vary between the front and rear fasteners 54.

Next, the operations of the present embodiment will be described.

Figure 12:
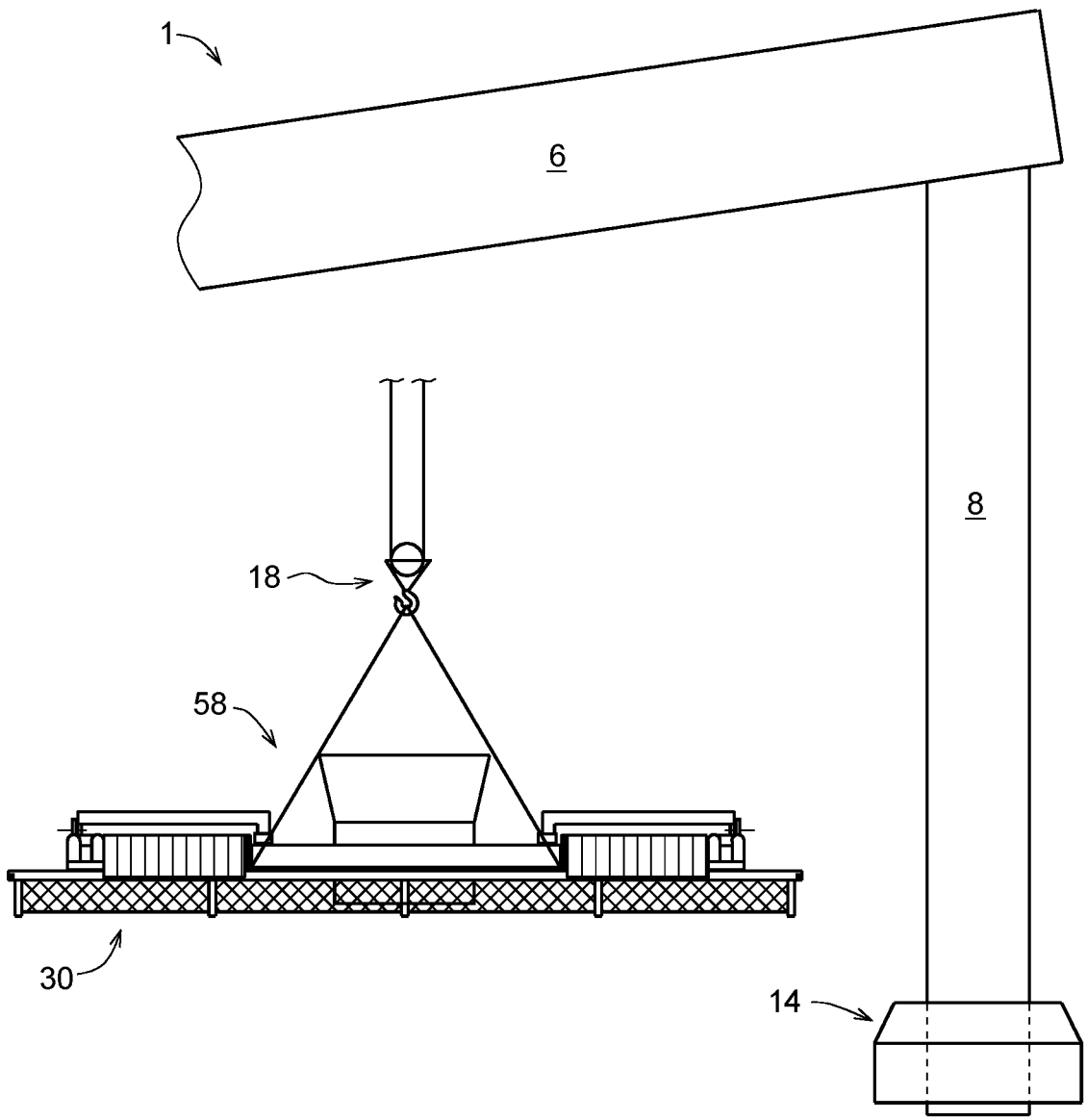
FIG. 12 is a side view of a chute unit in a hanging state.
Figure 13:
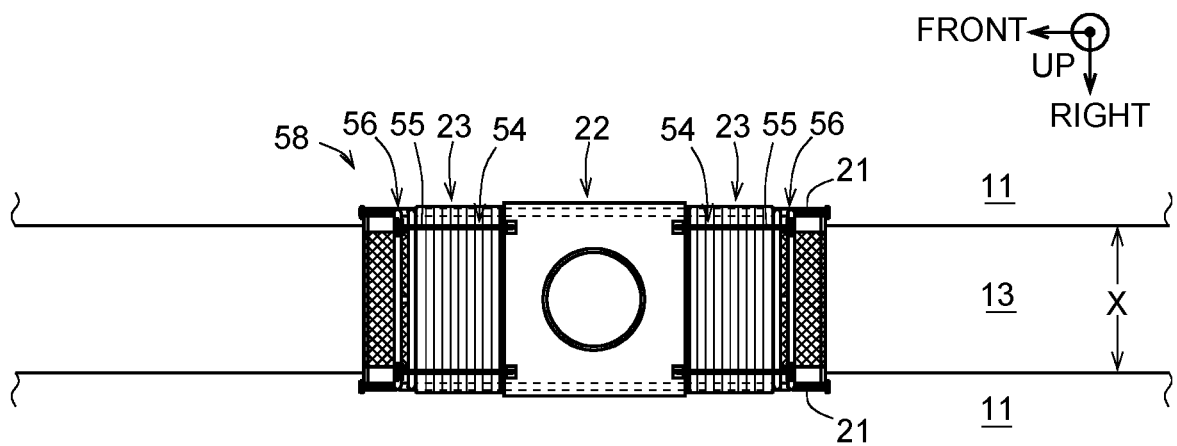
FIG. 13 is a top view showing a state in which a chute unit is placed on a sliding hatch cover.

When installing the rain-guard device for shipping 20 in the vessel 9, as shown in FIG. 12, the unloading device 18 that is provided in the shiploader 1 is used, and the chute unit 58 is transferred from the quay 2 onto the vessel and installed. At this time, as shown in FIG. 3, the sliding hatch covers 11 are opened in advance at a given distance X, so that a hatch opening 13 is formed. Here, the given distance X is a dimension that is determined by the length L1 of the beam frame 28 and the length L2 of the lower part 28c, and is set to a dimension that is smaller than the length L2 of the beam frame 28 and larger than the length L1 of the lower part 28c. The given distance X is 2 m, for example. Also, as shown in FIG. 13, the chute unit 58 is positioned at the center of the hatch opening 13 in front and rear directions (longitudinal direction), and set on the vessel so that the left and right rail pieces 21 are both positioned on the sliding hatch covers 11.

Figure 14:
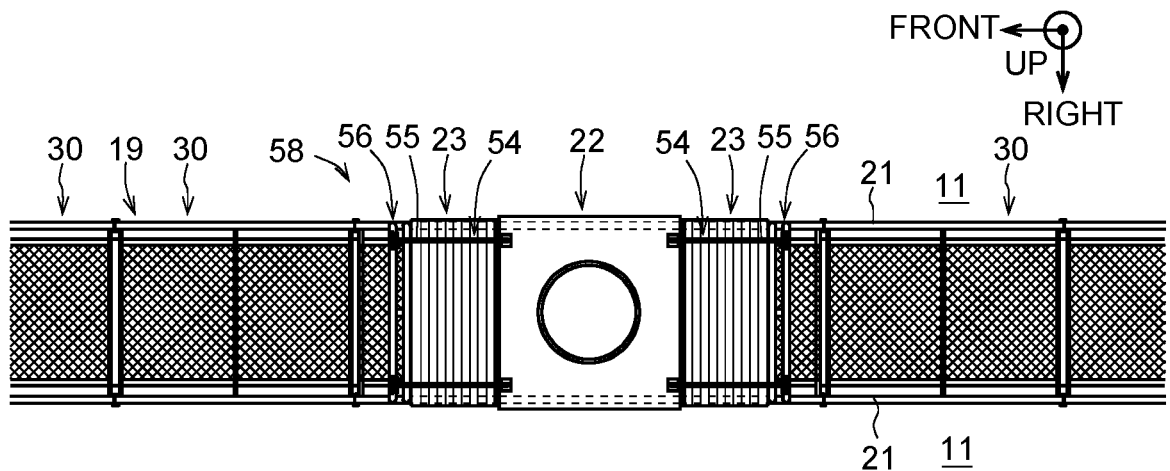
FIG. 14 is a top view showing a state in which a chute unit and a rail unit are placed on a sliding hatch cover.

After this, as shown in FIG. 14, a plurality of rail units 30 are transferred from the quay 2 onto the vessel, using the unloading device 18, and these rail units 30 are installed in the hatch opening 13 in front of and behind the chute unit 58. At this time, the female joining piece 27 (see FIG. 11) and the male joining piece 26 of neighboring rail units 30 are coupled with each other. To be more specific, by inserting the joining pin 26b of the male joining piece 26 into the insertion hole 27b of the female joining piece 27, the female joining piece 27 and the male joining piece 26 are coupled. By this means, rail pieces 21 that neighbor each other in front and rear are fixed in a positioned state.

Figure 15:
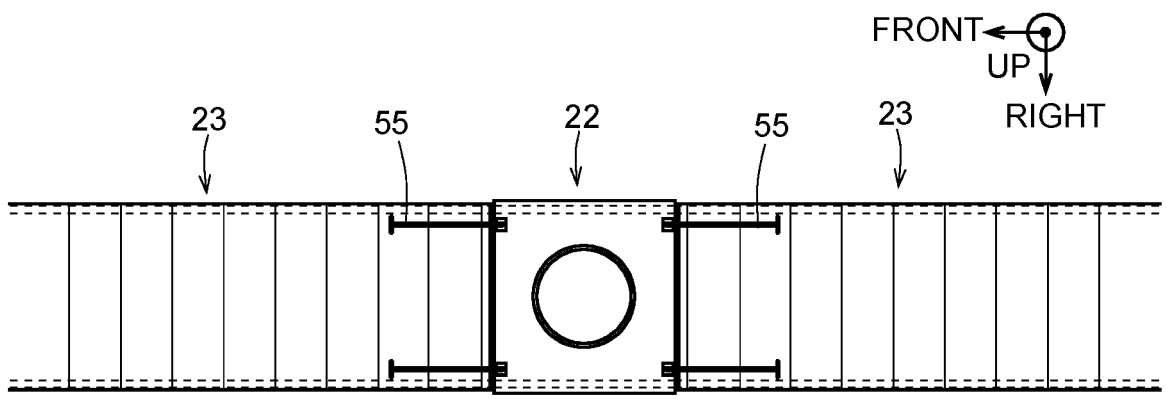
FIG. 15 is a top view showing a state in which a lid member of a chute unit is stretched.

Following this, the bolt 61 and the nut 62 are removed from the lower extending part 55c and the fastening bracket part 56c, and, furthermore, the bolt 63 is removed from the screw hole of the rail fixing part 57. Then, the engaging part 56 is removed from the rail piece 21 and the support rod 55, and, as shown in FIG. 15, the lid members 23 positioned in front of and behind the on-board chute 22 are both expanded. At this time, the front extending part 55b, the rear extending part 55b and the lower extending part 55c of the support rod 55 are positioned above the lid members 23. Consequently, when the lid members 23 are expanded, the support rod 55 does not interfere with the lid members 23. When the lid members 23 are expanded to near the front and rear end parts of the hatch opening 13, the engaging parts 56 of the lid members 23 are fixed to the rail pieces 21 near the front and rear end parts of the hatch opening 13 with bolts 63. By this means, the hatch opening 13 is sealed, over its entire length, with the on-board chute 22 and the lid members 23. Consequently, rainfall never seeps in except for the part of chute body part 32. Note that, if necessary, a lid (not shown) to seal the upper end opening of the chute body part 32 may be provided.

Figure 16:
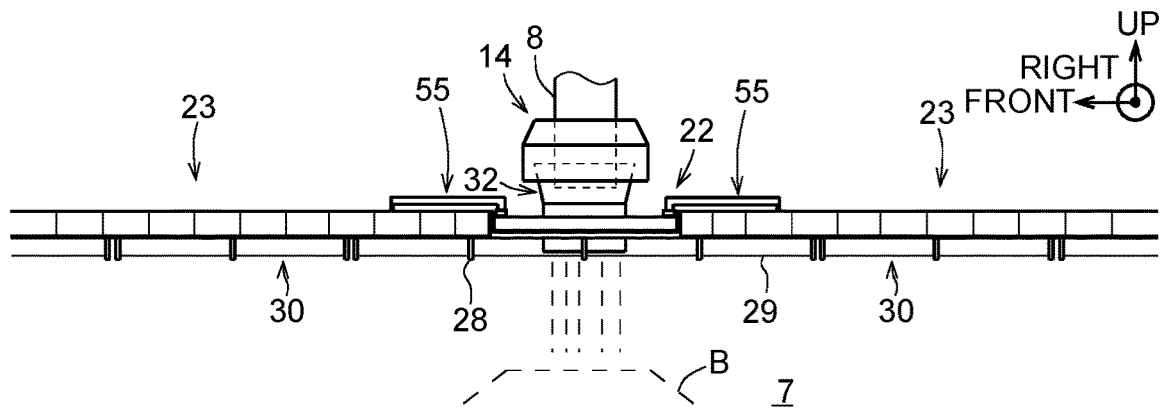
FIG. 16 is a side view showing a state in which cargo is loaded from an on-board chute into a hold.

Following this, as shown in FIG. 16, the chute part 8 of the shiploader 1 is inserted into the chute body part 32. After the chute part 8 of the shiploader 1 is inserted in the chute body part 32, the upper and side parts of the chute body part 32 are covered by the cover member 14. By this means, rainfall is prevented or restrained from seeping into the chute body part 32.

Cargo B that is thrown from the chute part 8 of the shiploader 1 into the chute body part 32 passes through the net 29 for preventing fall, and is thrown into the hold 7.

Figure 17:
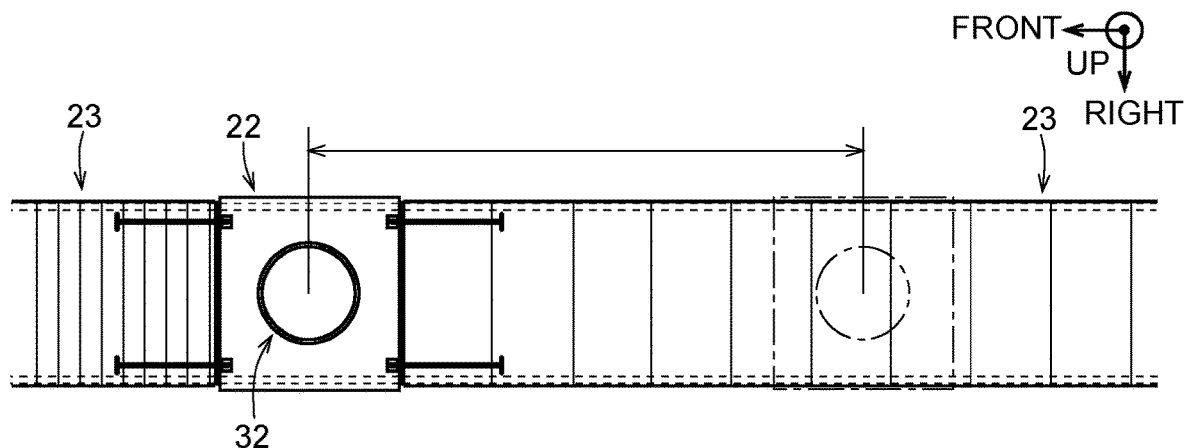
FIG. 17 is a top view showing a state in which an on-board chute is moved.
Figure 18:
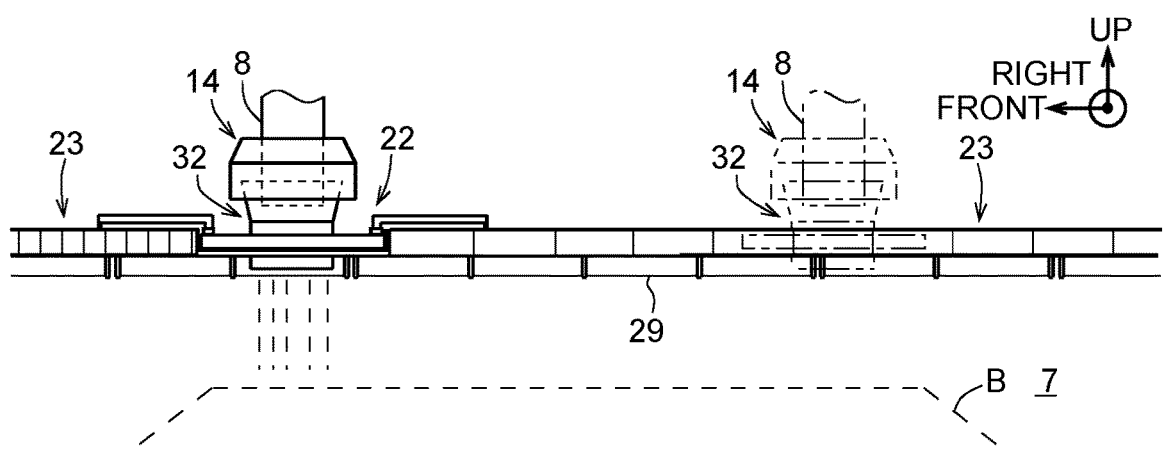
FIG. 18 is a side view showing a state in which cargo is loaded from an on-board chute that is moved, into a hold.

Next, with the chute part 8 being inserted in the chute body part 32, a throwing position for cargo B is moved in front and rear directions by making the shiploader 1 travel in front and rear directions as appropriate. For example, as shown in FIG. 17 and FIG. 18, when the chute part 8 of the shiploader 1 is moved forward, the chute body part 32 receives forward force from the cover member 14. By this means, the on-board chute 22 travels forward along the rail pieces 21. The lid member 23 ahead of the on-board chute 22 is retracted, and the lid member 23 behind the on-board chute 22 is expanded. Consequently, even when the on-board chute 22 is moved forward, the hatch opening 13 is not opened, so that rainfall is prevented or restrained from entering the hold 7.

In addition, by allowing the on-board chute 22 to travel back and forth, it is possible to load cargo B into the hold 7 such that cargo B is distributed in front and rear directions. By this means, cargo B can be loaded in the hold 7 at a high filling rate. Note that, the one-dot chain lines in the drawing show the rear end position where the on-board chute 22 travels backward. The range in which the on-board chute 22 can travel is determined by the longest length and the shortest length of the lid members 23 as expanded and contracted.

Afterwards, the operations described above will be repeated for every hold 7.

In this way, the rain-guard device for shipping 20 has rails 19, an on-board chute 22 that is provided on the rails 19 in a travelable manner, and lid members 23, and the lid members 23 are disposed in front of and behind the on-board chute 22, and, furthermore, constructed to expand and contract as the on-board chute 22 travels. Consequently, it is possible to seal the hatch opening 13 by using simple structures and at low cost, and cope with even large vessels 9 easily. Then, by allowing the on-board chute 22 to travel in front and rear directions and loading cargo B, cargo B can be loaded in the hold 7 at a high filling rate.

The lid members 23 are provided on rails 19 in a travelable manner. Consequently, the lid members 23 can be expanded and contracted in a stable manner.

The lid members 23 are formed in a bellows shape. Consequently, the lid members 23 can be structured simply, and be expanded and contracted in a stable manner.

A lid member 23 has one end fixed to the on-board chute 22, and the other end fixed to a rail 19 near an end part of the hatch opening 13. Consequently, the lid member 23 can be structured simply, and expanded and contracted as the on-board chute 22 travels. Also, it is possible to fix the other end of the lid member 23 to the rail 19, and, meanwhile, move the one end of the lid member 23 smoothly, in the direction of expansion and contraction, as the on-board chute 22 travels.

Incidentally, it is also possible to envisage to fix the other end of the lid member 23 to the vessel's body. However, some processing needs to be applied to the vessel's body, and such a structure may be more complex than the present embodiment. Furthermore, it may be possible to envisage to fix the other end of the lid member 23 to another member, such as a weight or the like. However, the number of components to be transferred to the vessel increases from the present embodiment, and such a structure may be more complex than the present embodiment. As with the present embodiment, by fixing the other end of a lid member 23 to a rail piece 21, the other end of the lid member 23 can be fixed with a simple structure.

A rail 19 is made up by joining a plurality of rail pieces 21 in the longitudinal direction, and the other end of the lid member 23 is detachably fixed to the rail 19 near an end part of the hatch opening 13. Consequently, the rail 19 can be handled easily, and, for example, the task of transferring the rail 19 from the quay 2 onto the vessel and installing it can be made simply.

In the on-board chute 22, fasteners 54 to hold the lid members 23 in a contracted state are provided. Consequently, the on-board chute 22 and the lid members 23 can be put together in a compact way, and the on-board chute 22 and the lid members 23 can be handled easily. For example, the on-board chute 22 and the lid members 23 can be disposed in the hatch opening 13 altogether. Also, when not in use, the on-board chute 22 and the lid members 23 can be accommodated in a small area in a warehouse or the like.

A fastener 54 has a rail fixing part 57 that is fixed to a rail 19. Consequently, the on-board chute 22 and the lid members 23 can be put together with the rails 19 in a compact way, so that the on-board chute 22, the lid members 23 and the rails 19 can be handled even more easily. For example, when the on-board chute 22, the lid members 23 and the rails 19 are arranged in the hatch opening 13, the on-board chute 22 and the lid members 23 can be set on the rails 19, and, in this state, arranged on the hatch opening 13. Furthermore, when removing the on-board chute 22 and the lid members 23 from the hatch opening 13, the on-board chute 22 and the lid members 23 do not have to be dissembled from the rails 19, and can be removed easily and quickly.

The left and right rails 19 are joined via a beam frame 28. Consequently, when disposing the rails 19 on the left and right sliding hatch cover covers 11, it is possible to dispose the rails 19 easily, while maintaining a fixed distance between the left and right rails 19.

A net 29 is provided between the left and right rails 19 for preventing fall into the hold 7. By this means, it is possible to prevent or restrain articles placed on the sliding hatch covers 11, workers and so forth, from falling into the hold 7 from the hatch opening 13 positioned between the left and right rails 19.

In the rail 19, a guard member 24 for preventing water from seeping into the hatch opening 13 is provided along the longitudinal direction of the rail 19. Consequently, it is possible to stop the rainwater that travels toward the hatch opening 13 with the guard member 24, and prevent or restrain the rainwater or the like from seeping into the hold 7.

Between the rail 19 and the sliding hatch cover 11, a water-stop material 25 that is elastic and absorbs the bumps on the sliding hatch cover 11 is interposed. Consequently, it is possible to stop the rainwater that travels from between the rail 19 and the sliding hatch cover 11 toward the hatch opening 13.

Also, at the other end of the lid member 23, an end-part sheet 64 for preventing rainwater from seeping into the hatch opening 13 is arranged. Consequently, it is possible to stop the rainwater that travels from the other end of the lid member 23 towards the hatch opening 13.

Although an embodiment of present disclosure has been described above in detail, the present disclosure is also capable of other embodiments such as the following:

Although the on-board chute 22 has been described to travel as pushed by the cover member 14, this is by no means limiting. For example, the on-board chute 22 may be pushed directly by the chute part 8. Also, the on-board chute 22 may be driven by being pushed by human hands. In this case, a handle for hand-pushing (not shown) may be provided in the chute body part 32. Furthermore, the on-board chute 22 may have a driving device (not shown) such as a motor or the like, and move by itself.

Figure 19:
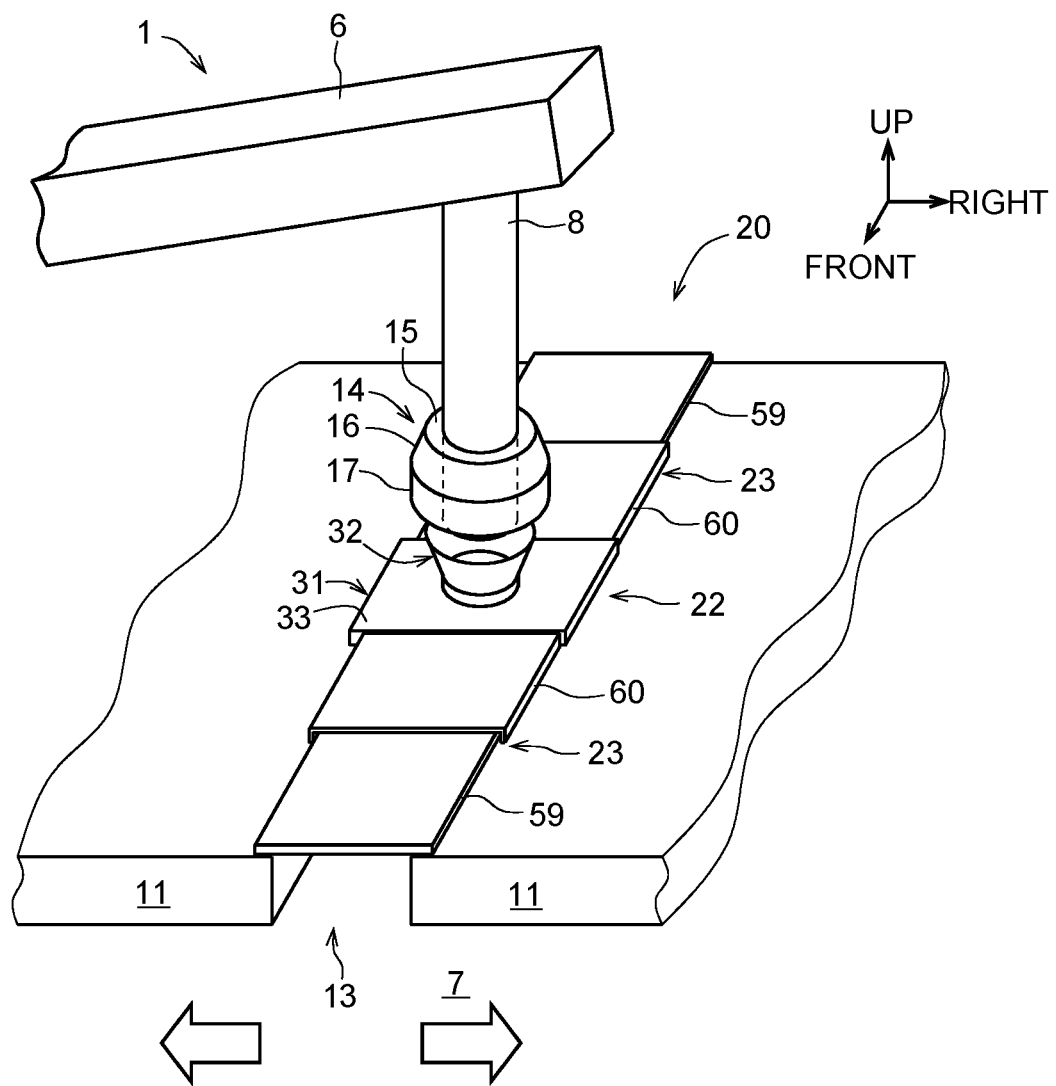
FIG. 19 is a perspective view of a lid member, showing another embodiment.

Although the lid member 23 has been described to be formed in a bellows shape, this is by no means limiting. The lid member 23 has only to expand and contract as the on-board chute 22 travels. For example, as shown in FIG. 19, the lid member 23 may be made up by joining a plurality of lid plate materials 59 and 60 in an axially slidable manner, in a telescopic shape.

Figure 20:
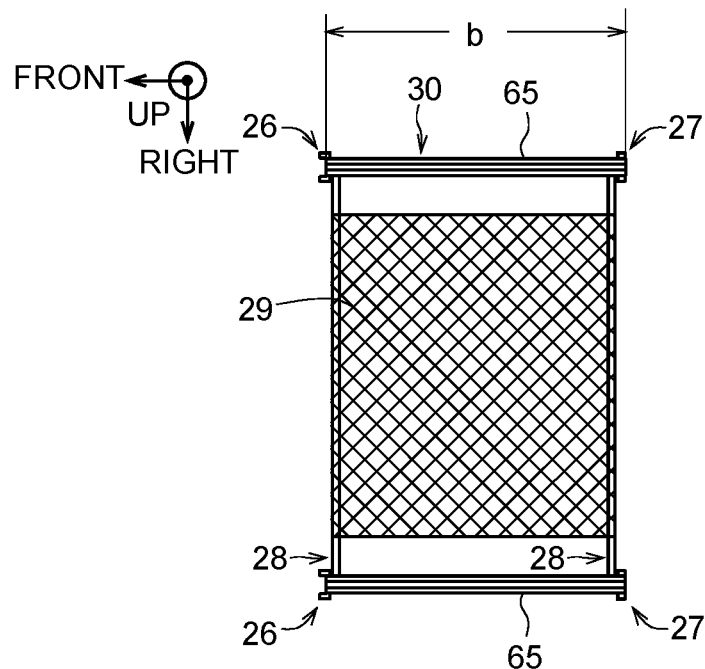
FIG. 20 is a top view of a rail unit, showing another embodiment.

(3) The sliding hatch covers 11 have various sizes, and the length of the sliding hatch covers 11 in front and rear directions (directions that are orthogonal to the directions in which the sliding hatch covers 11 open and close) is not fixed either. Consequently, the rail 19 may be made up by combining the rail pieces 21 shown in FIG. 10 with rail pieces 65 having a different length from these (see FIG. 20). In other words, the rail 19 may be made up by joining a plurality of types of rail pieces 21 and 65 having varying lengths, in the longitudinal direction. In this case, the rail pieces 21 may be set to an upper limit length a that allows easy handling, and the rail pieces 65 may be set to a length b that is shorter than the rail pieces 21. Then, as many rail pieces 21 as possible may be used, and the shortage may be supplemented with one or more rail pieces 65. The length of the rail 19 can be made close to the length of the sliding hatch cover 11 in front and rear directions, while reducing the number of times the task of joining rail pieces 21 and 65 is performed. It should be understood that other rail pieces (not shown) having different lengths than the rail pieces 21 or 65 may be provided additionally. The rail pieces to use can be selected in a more flexible way, and the length of the rail 19 can be made even closer to the length of the sliding hatch covers 11 in front and rear directions.

Figure 21:
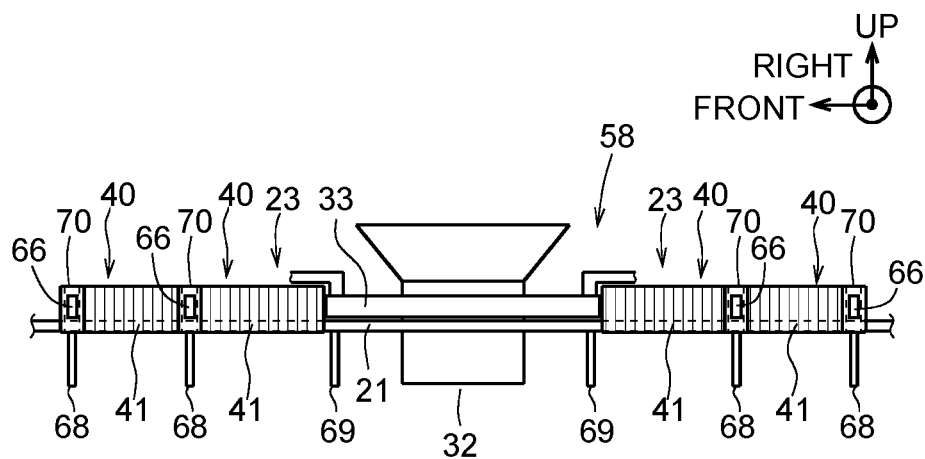
FIG. 21 is a side view of a chute unit, showing another embodiment.
Figure 22:
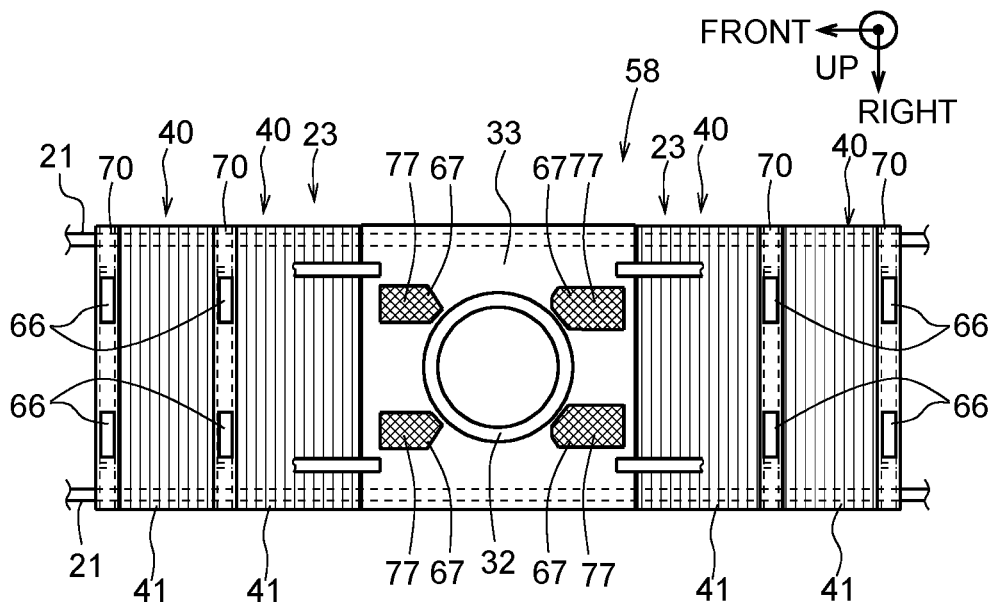
FIG. 22 is a top view of a chute unit, showing another embodiment.

(4) As shown in FIG. 21 and FIG. 22, in one or both of the traveling part 4 of the on-board chute 22 and the lid members 23, windows 66 and 67 for checking the condition of cargo visually may be provided. Also, in the traveling part 4 of the on-board chute 22 and the lid members 23, legs 68 and 69 may be provided to support these. A rain-guard device for shipping (another embodiment) having windows 66 and 67 and legs 68 and 69 will be described below. Note that components that are the same as those described earlier will not be described, and will be assigned the same reference numerals.

A lid member 23 has a plurality of frame structures 40, which are formed to be expandable and contractable in front and rear directions, frame support parts 70, which are provided between the frame structures 40 and at the end parts of the frame structures 40 in front and rear directions, and water-stop sheets 41, which are provided in each frame structure 40.

Figure 23:
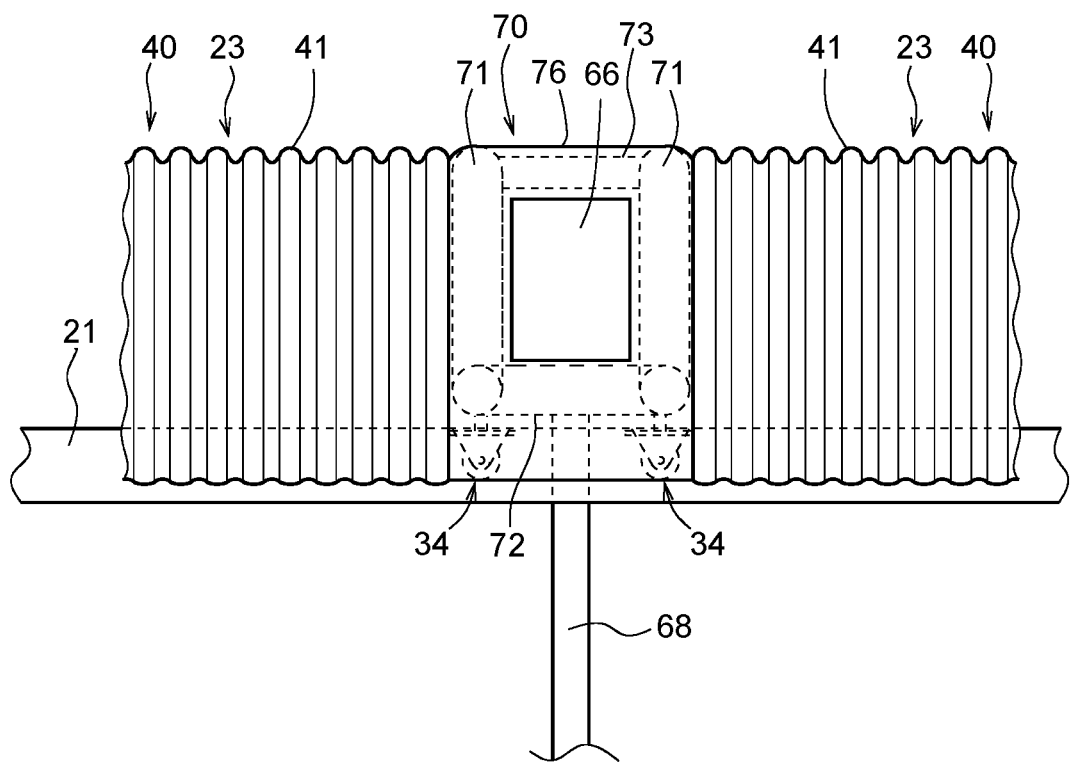
FIG. 23 is an enlarged view of a main part of FIG. 21.
Figure 24:
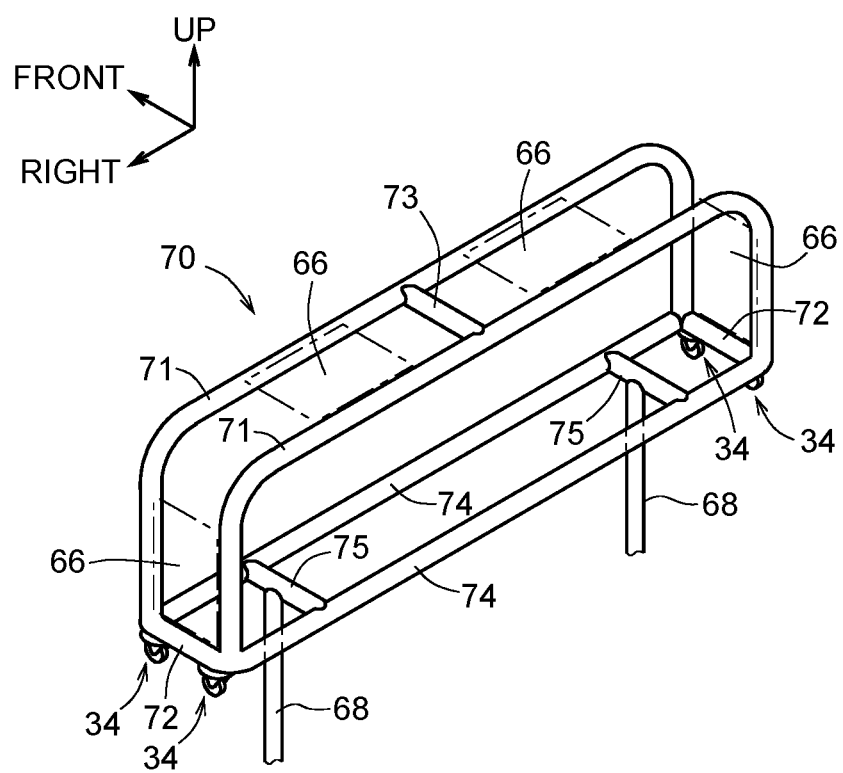
FIG. 24 is a perspective view of a main part of a lid member, according to another embodiment.

As shown in FIG. 23 and FIG. 24, the frame support parts 70 are for supporting the frame structures 40. The frame support part 70 has a pair of front and rear support arch parts 71, formed in the shape of an arc extending in left and right directions, a pair of left and right base parts 72, which connect between these support arch parts 71, and a ridge part 73, which connects between the front and rear support arch parts 71.

The support arch parts 71 are disposed spaced apart in front and rear directions. The support arch parts 71 are formed in substantially the same shape as arch frames 42, and, furthermore, set in substantially the same outer dimensions in left and right directions and in up and down directions. The base parts 72 are formed to extend in front and rear directions, and arranged on both the left and right sides of the support arch parts 71. At the lower ends of the base parts 72, fixed casters 34 are provided. The ridge part 73 is formed to extend in front and rear directions, and arranged at the central position of the support arch 71 in left and right directions.

Furthermore, in each support arch part 71, a first intermediate frame 74 is provided. The first intermediate frame 74 is formed to extend in left and right directions, and provided between the left and right lower end parts of the support arch part 71. The first intermediate frame 74 is connected to the support arch part 71 at both ends. Also, with the first intermediate frame 74, a pair of second intermediate frames 75 are provided spaced apart in left and right directions. The second intermediate frames 75 extend in front and rear directions, and provided between front and rear first intermediate frames 74. The second intermediate frames 75 are connected to the first intermediate frames 74 at both ends.

Also, in the second intermediate frames 75, first legs 68 are provided. The first legs 68 are for placing the chute unit 58 on board, such as on the sliding hatch covers 11. The first legs 68 extend downward from the second intermediate frames 75, and, furthermore, extend downward beyond the chute body part 32. Also, the first legs 68 are arranged so as to be inserted in the hatch opening 13 when the chute unit 58 is installed in the hatch opening 13.

Also, with the present embodiment, when the chute unit 58 is transferred between the quay 2 and a vessel, no beam frame 28 or net 29 is provided in rail pieces 21 that are made a unit together with the chute unit 58. Also, the beam frames 28 of rail units 30 disposed in front of and behind the chute unit 58 are formed so that their lower step parts 28c are positioned below the first legs 68 and the second leg 69, which will be described later. By this means, the first legs 68 and second legs 69 do not interfere with the beam frames 28 and the nets 29.

Furthermore, in the front and rear support arch parts 71, a rain guard sheet 76 is provided, so as to seal between front and rear support arch parts 71. The rain guard sheet 76 is made of a material that does not allow water to pass through, such as water-repellent cloth, resin and so forth. Also, first windows 66 are provided in the rain guard sheet 76. The first windows 66 are for looking into the hold 7 on-board, and made of a material that is transparent and does not allow water to pass through, such as glass, resin and so forth. The first windows 66 are arranged in the left and right side surfaces and the top surface of the frame support part 70. In particular, the first windows 66 arranged in the top surface of the frame support part 70 are disposed closer to the center in left and right directions than the second intermediate frames 75, so that the second intermediate frames 75 do not block the field of view.

Furthermore, second windows 67 are provided in the traveling base part 33 of the on-board chute 22. The second windows 67 are arranged in a plurality of locations on the traveling base part 33 so as to surround the outer periphery of the chute body part 32. To be more specific, the second windows 67 are disposed in four locations—namely, in front to the right, in front to the left, behind to the right and behind to the left of the chute body part 32. The second windows 67 are made of a material that is transparent and does not allow water to pass through, such as glass, resin and so forth. In addition, protection members 77 for protecting the second windows 67 are provided above the second windows 67. The protection members 77 are made of a meshed floor material such as expanded metal, grating and so forth. Note that, when the second windows 67 are made of a sufficiently strong material such as tempered glass, polycarbonate and so forth, the protection members 77 may be omitted. Also, the protection members 77 may be made of a material that is transparent and strong, such as tempered glass, polycarbonate and so on.

In addition, second legs 69 are provided in the traveling base part 33 of the on-board chute 22. The second legs 69 are used to place the chute unit 58 on board, such as on the sliding hatch covers 11. The second legs 69 extend downward from the plate-like traveling base part 33, and extend downward beyond the chute body part 32. Then, the second legs 69 are formed so that their lower end positions in the direction of height are the same as the lower end positions of the first legs 68. Also, the second legs 69 are disposed to be inserted in the hatch opening 13 when the chute unit 58 is installed in the hatch opening 13.

With the chute unit 58 of the embodiment according to FIG. 1 to FIG. 18, it was necessary to transfer the chute unit 58 from the quay 2 to the hatch opening 13 while the hatch opening 13 is formed between the sliding hatch covers 11. It then follows that the hatch opening 13 stays open while the chute unit 58 is transferred from the quay 2 to the hatch opening 13. Also, if the chute unit 58 is placed temporarily on a sliding hatch cover 11, the beam frame 28 may be damaged, and, furthermore, the chute body part 32 may hit the sliding hatch cover 11 and be damaged.

So, with the present embodiment, legs 68 and 69 that extend downward beyond the chute body part 32 are provided in the traveling base part 33 of the traveling part 4 and the lid members 23. Consequently, when the chute unit 58 is transferred from the quay 2 onto the vessel, the chute unit 58 can be placed on-board temporarily, such as on the sliding hatch cover 11. By this means, it is possible to keep the sliding hatch covers 11 closed while the chute unit 58 is transferred from the quay 2 onto the vessel, and, furthermore, restrain the cargo in the hold 7 from getting wet with rainwater.

The configurations of each embodiments described above can be combined partially or entirely, as long as there are no significant inconsistencies. Embodiments of the present disclosure are by no means limited to the foregoing embodiments, and any variations, applications, and equivalents encompassed by the concept of the present disclosure defined by the appended claims are included in the present disclosure. Accordingly, the present disclosure is not to be construed as limiting, but is applicable to any other techniques that fall within the scope of the concept of the present disclosure.

What is claimed is:

1. A rain-guard device for shipping, comprising:
a rail, which is disposed on a sliding hatch cover that opens and closes an upper opening of a hold of a vessel;
an on-board chute, which is provided on the rail in a travelable manner, covers part of a hatch opening that is formed when the sliding hatch cover opens, and, furthermore, supplies cargo from a shiploader into the hold; and
a lid member, which covers another part of the hatch opening, wherein
the lid member is disposed both in front and in rear in a traveling direction of the on-board chute, and, furthermore, configured to expand and contract as the on-board chute travels, and
a fastener for holding the lid member in a contracted state is provided in the on-board chute.

2. The rain-guard device for shipping according to claim 1, wherein
the fastener comprises a rail fixing part that is fixed to the rail.

3. The rain-guard device for shipping according to claim 1, wherein
the lid member comprises one end, which is fixed to the on-board chute, and another end, which is fixed to the rail near an end part of the hatch opening.

4. The rain-guard device for shipping according to claim 3, wherein
the rail is made up by joining a plurality of rail pieces in a longitudinal direction; and
the other end of the lid member is detachably fixed to the rail near the end part of the hatch opening.

5. A rain-guard device for shipping, comprising:
a rail, which is disposed on a sliding hatch cover that opens and closes an upper opening of a hold of a vessel;
an on-board chute, which is provided on the rail in a travelable manner, covers part of a hatch opening that is formed when the sliding hatch cover opens, and, furthermore, supplies cargo from a shiploader into the hold; and
a lid member, which covers another part of the hatch opening, wherein
the lid member is disposed both in front and in rear in a traveling direction of the on-board chute, and, furthermore, configured to expand and contract as the on-board chute travels,
the rail is disposed in both left and right sliding hatch covers, and left and right rails are joined via a beam frame, and
a net for preventing fall into the hold is provided between the left and right rails.

6. A rain-guard device for shipping, comprising:
a rail, which is disposed on a sliding hatch cover that opens and closes an upper opening of a hold of a vessel;
an on-board chute, which is provided on the rail in a travelable manner, covers part of a hatch opening that is formed when the sliding hatch cover opens, and, furthermore, supplies cargo from a shiploader into the hold; and
a lid member, which covers another part of the hatch opening, wherein
the lid member is disposed both in front and in rear in a traveling direction of the on-board chute, and, furthermore, configured to expand and contract as the on-board chute travels, wherein
the on-board chute comprises a traveling part which travels on the rail, and a chute body part which is provided to penetrate the traveling part in a vertical direction,
the chute body part extends downward below the traveling part, and
a leg that extends downward below the chute body part is provided in the traveling part and the lid member.

7. The rain-guard device for shipping according to claim 6, wherein
when the rail is disposed on the sliding hatch cover, the traveling part is disposed on the rail in a travelable manner and the chute body part is inserted in the hatch opening, the leg is arranged on the chute body part so as to be inserted in the hatch opening.

8. The rain-guard device for shipping according to claim 1, wherein the lid member is provided on the rail in a travelable manner.

9. The rain-guard device for shipping according to claim 1, wherein
the lid member is formed in a bellows shape.

10. The rain-guard device for shipping according to claim 1, wherein,
the rail is disposed in both left and right sliding hatch covers, and the left and right rails are joined via a beam frame.

11. The rain-guard device for shipping according to claim 1, wherein,
a guard member for preventing water from seeping into the hatch opening is provided in the rail along the longitudinal direction of the rail to stick out upward above the rail.

12. The rain-guard device for shipping according to claim 1, wherein,
an elastic water-stop material is interposed between the rail and the sliding hatch cover to abut the sliding hatch cover.

13. The rain-guard device for shipping according to claim 1, wherein
the rail is made up by joining a plurality of types of rail pieces having varying lengths, in the longitudinal direction.

14. The rain-guard device for shipping according to claim 1, wherein,
a window for checking condition of cargo visually is provided in one or both of the on-board chute and the lid member.

15. A rain-guard device for shipping, comprising:
a rail, which is disposed on a sliding hatch cover that opens and closes an upper opening of a hold of a vessel;
an on-board chute, which is provided on the rail in a travelable manner, covers part of a hatch opening that is formed when the sliding hatch cover opens, and, furthermore, supplies cargo from a shiploader into the hold; and
a lid member, which covers another part of the hatch opening, wherein
the lid member is disposed both in front and in rear in a traveling direction of the on-board chute, and, furthermore, configured to expand and contract as the on-board chute travels,
the lid member comprises one end, which is fixed to the on-board chute, and another end, which is fixed to the rail near an end part of the hatch opening,
an arch part formed in an arch shape is arranged at the other another end of the lid member,
an end-part sheet for preventing rainwater from seeping into the hatch opening is arranged at another end of the lid member, and the end-part sheet is provided in the arch part to hang down from an upper edge of the arch part.

* * * * *